(12) United States Patent
Johnson et al.

(10) Patent No.: US 9,266,490 B2
(45) Date of Patent: Feb. 23, 2016

(54) JOHNSON ATV SAFETY BAR

(71) Applicants: Jerry Johnson, Baker City, OR (US);
Nadejda Ivanovna Johnson, Baker City, OR (US)

(72) Inventors: Jerry Johnson, Baker City, OR (US);
Nadejda Ivanovna Johnson, Baker City, OR (US)

(*) Notice: Subject to any disclaimer, the term of this patent is extended or adjusted under 35 U.S.C. 154(b) by 0 days.

(21) Appl. No.: 14/526,197

(22) Filed: Oct. 28, 2014

(65) Prior Publication Data

US 2015/0197208 A1 Jul. 16, 2015

Related U.S. Application Data

(60) Provisional application No. 61/962,139, filed on Nov. 1, 2013.

(51) Int. Cl.
*B60R 21/13* (2006.01)
*B60R 22/20* (2006.01)
*B60R 21/02* (2006.01)
*B60R 22/02* (2006.01)

(52) U.S. Cl.
CPC .............. *B60R 21/13* (2013.01); *B60R 22/20* (2013.01); *B60R 2021/028* (2013.01); *B60R 2022/027* (2013.01)

(58) Field of Classification Search
CPC ........ B60R 21/13; B60R 22/20; B60R 22/34; B60R 21/055; B60R 2021/028
See application file for complete search history.

(56) References Cited

U.S. PATENT DOCUMENTS

| | | | | |
|---|---|---|---|---|
| 4,148,504 A | * | 4/1979 | Rushing | 280/756 |
| 4,198,072 A | * | 4/1980 | Hopkins | 280/267 |
| 4,673,190 A | * | 6/1987 | Ahlberg | 280/304.3 |
| 4,798,399 A | * | 1/1989 | Cameron | 280/756 |
| 5,000,480 A | * | 3/1991 | Straka et al. | 280/756 |
| 5,110,185 A | * | 5/1992 | Schmutz et al. | 297/410 |
| 5,174,622 A | * | 12/1992 | Gutta | 296/77.1 |
| 5,205,585 A | * | 4/1993 | Reuber et al. | 280/753 |
| 5,718,454 A | * | 2/1998 | Harrod | 280/756 |
| 6,142,253 A | * | 11/2000 | Mueller et al. | 180/219 |
| 6,908,107 B2 | * | 6/2005 | Barth | 280/756 |
| 2005/0121897 A1 | * | 6/2005 | Elizondo et al. | 280/801.1 |
| 2008/0122210 A1 | * | 5/2008 | Liesaus et al. | 280/756 |
| 2008/0136155 A1 | * | 6/2008 | Janisch et al. | 280/756 |
| 2008/0197613 A1 | * | 8/2008 | Latussek | 280/756 |
| 2009/0095555 A1 | * | 4/2009 | Nass et al. | 180/282 |
| 2010/0052301 A1 | * | 3/2010 | Robertson et al. | 280/756 |
| 2012/0098244 A1 | * | 4/2012 | Browne et al. | 280/801.1 |
| 2013/0009391 A1 | * | 1/2013 | Miller et al. | 280/806 |

FOREIGN PATENT DOCUMENTS

FR 2616182 A * 12/1988

* cited by examiner

*Primary Examiner* — Paul N Dickson
*Assistant Examiner* — Darlene P Condra

(57) ABSTRACT

The Johnson ATV Safety Bar including an articulating adjustable roll bar (12), a seat back (74), a safety seat belt (16), an adjustable foot and leg guard (18) and an articulating adjustable mounting bracket (9). The roll bar (12) may prevent injury or death in cases of ATV rollover accidents or crashes by absorbing the brunt of the force from the rolling or falling ATV. The seat back (14) may include a rope or strap (64) laced between metal bars (60) having a series of holes (62), the metal bars (60) being integrated onto the roll bar (12). The safety belt (16) may be attached to the roll bar (12) at various points (68) and may be configurable to meet the preference of the ATV operator. The system may include a seat belt retractor (140) to secure the operator on the ATV. The system may include an articulating adjustable ATV roll bar protection system (12) designed to fit various sizes and brands of ATVs.

1 Claim, 19 Drawing Sheets

JOHNSON ATV SAFETY BAR

BACKGROUND

1. Field of the Invention

The present disclosure related generally to a roll bar system and more specifically to a roll bar system for use with all-terrain vehicles (ATVs) of various sizes and brands that is articulating and adjustable.

2. Description of the Related Art

Typically, ATVs are used in off-road applications. For both recreational and work-related uses. An ATV may be generally defined as a vehicle with three or four wheels, a seat that is straddled by a vehicle operator, and handlebars for steering control. An ATV may accommodate only a single rider, or may additionally have seating for a passenger. For the purpose of this disclosure, any use of the term "ATV" herein denotes this generally-accepted definition, and additionally may include any other small off-road vehicles such as a Side by Side or other utility vehicle. The ATV descriptions included herein may refer to a single-occupant ATV or may refer to ATVs that carry passengers.

One principle advantage of ATVs over automobiles is that an ATV may be able to negotiate terrain that is too rough or constricted for a larger vehicle to traverse. As a result, operators may use ATVs by necessity in many areas where the ground is uneven and/or full of obstacles such as trees, hills, boulders, and the like. ATVs may be prone to rollover accidents due to their relatively high center of gravity and likelihood of being operated on steep and/or uneven inclines, around sharp corners and near obstacles. Rollover accidents are very dangerous and may cause serious injury or even death to operators and passengers.

One reason why ATV rollover accidents are dangerous is due to the weight of a typical ATV. ATVs may weigh upwards of 850 pounds or more. If a rollover accident occurs, the ATV may roll or fall on top of the operator or passenger.

The U.S. Consumer Product Safety Commission (CPSC) staff began analyzing ATV related incident data in the early 1980s. By Dec. 31, 2009 CPSC staff had received reports of 10,281 ATV related deaths that occurred between 1982 and 2009. The CPSC reported 150,900 ATV accidents and 766 reported deaths in 2007. In 2012 the CPSC reports that over 600 a year are killed on ATVs, and it is one of deadliest products under CPSC's jurisdiction, with an annual societal cost of 10.3 Billion Dollars. The CPSC also reports that 26 percent of the 10,281 deaths were children under 16 years of age. As the use of ATVs continues to increase, one may expect that ATV related injures and deaths will likewise continue to rise.

As a result of the danger that potential rollovers pose to ATV operators and passengers, there is a need for an ATV roll bar system that may protect the ATV operator and passengers from injury or death in the event of a rollover.

SUMMARY

The aforementioned drawbacks associated with ATVs are addressed by embodiments in this disclosure, which will be understood by one of ordinary skill in the art having the benefit of this disclosure. This summary is not an exhaustive overview and it is not intended to identify key or critical elements of the disclosure or to delineate the scope of the disclosure as set forth in the appended claims.

An illustrative embodiment of the present disclosure is directed to a roll bar system adapted for an all-terrain vehicle (ATV) including a roll bar, a seat back, a seat belt and a foot and leg guard.

In one aspect of the present invention, there is provided an articulating adjustable ATV roll bar system, comprising: a roll bar having a first adjustable side member, a second adjustable side member, a, first top member, a second top member, wherein the first and a second adjustable side members are connected accordingly to the first and to the second top members by rotating locking joints, and wherein the first and second top members are connected by a tube bracket connector, wherein lights and seatbelt are connected, and wherein the first and second adjustable side members and the first and second top members comprise tubing, and wherein the adjustable side members generally extend vertically and are connected at the bottom to the landing foot brackets by rotating locking joints, and landing foot brackets are connected to the articulating adjustable ATV mounting bracket, wherein said bracket is bolted to the ATV bottom frame, thereby forming a protective frame around the ATV rider; a seat back comprising a flexible material bound between the first and second adjustable side members; a first and a second adjustable rear support members, wherein a first end of the first adjustable support member is connected to the first adjustable side member by an universal joint and a second end of the first adjustable support member is connected to a rear adjustable support mounting bracket by an universal joint, and wherein a first end of the second adjustable support member is connected to the second adjustable side member by an universal joint and a second end of the second adjustable support member is connected to the rear adjustable support mounting bracket by an universal joint, wherein the rear adjustable support mounting bracket is fixed to the rear ATV frame by rear mounting channel clamps; a first and a second adjustable side support beams, wherein a first end of the first adjustable side support beam is connected to the first adjustable rear support member by an universal joint and a second end of the first adjustable side support beam is connected to the first adjustable side member by an universal joint, and wherein a first end of the second adjustable side support beam is connected to the second adjustable rear support member by an universal joint, and wherein a second end of the second adjustable side support beam is connected to the second adjustable side member by an universal joint, and wherein a first and a second adjustable rear support members and a first and a second adjustable side support beams can be extended or shortened to assure perfect alignment and proper fit, and wherein said members has predrilled holes to accept a horizontal mounting plate for a seatbelt retractor and said members has a flat steel bars attached to accept a rope webbing safety back support; a first and a second shoulders comprising a formed metal tubing, wherein said shoulders are attached to the first and second adjustable side members accordingly, and wherein a body protective paddings are attached to each shoulder; a seat belt and a plurality of seat belt connectors fixed to the roll bar, the seat belt connectors adapted to connect a portion of the seat belt to the roll bar; a seat belt retractor having a locked state and an unlocked state, wherein a portion of the seat belt is connected within the retractor, and wherein the retractor is adapted to allow extension of the seat belt from within the retractor while unlooked and to prevent extension of the seat belt from within the retractor while locked; an adjustable foot and leg guard attached to a bottom portion of each adjustable side member and to an ATV body by an angle steel support bracket.

An illustrative embodiment of the present disclosure is directed to a roll bar system adapted for an all-terrain vehicle (ATV) including a roll bar and a seat back. The roll bar has a first and a second adjustable side members, a first and a second top members, a first and second adjustable rear support members, a first and second adjustable side support beams, a seat belt, a plurality of seat belt connectors, a seatbelt retractor, an adjustable foot and leg guard and an articulating adjustable ATV mounting bracket. The adjustable side members extend vertically and are connected to the top members by a rotating locking joints. The first and second top members are connected by a tubing sleeve comprising a steel tube bracket connector. The roll bar is connected to an ATV frame at the bottom by articulating adjustable ATV mounting bracket. The two adjustable side members, two top members and articulating adjustable ATV mounting bracket along with first and second adjustable rear support members and first and second adjustable side support beams thereby forming a protective frame around the ATV rider.

The seat back may further include a nylon rope that extends between the first and the second adjustable side members. A first end of the first adjustable support member is connected to the first adjustable side member and a second end of the first adjustable support member is connected to a rear adjustable support mounting bracket. A first end of the second adjustable support member is connected to the second adjustable side member and a second end of the second adjustable support member is connected to the rear adjustable support mounting bracket. The rear adjustable support mounting bracket is fixed to the ATV frame. A first end of the first adjustable side support beam is connected to the first adjustable rear support member and a second end of the first adjustable side support beam is connected to the first adjustable side member. A first end of the second adjustable side support beam is connected to the second adjustable rear support member. A second end of the second adjustable side support beam is connected to the second adjustable side member. The roll bar system may further include an adjustable foot and leg guard.

The plurality of seat belt connectors' are fixed to the roll bar and are adapted to connect a portion of the seat belt to the roll bar. The seat belt retractor is fixed to the rear adjustable support mounting bracket. The seat belt retractor has a locked state and an unlocked state.

Another illustrative embodiment of the present disclosure is directed to a roll bar system adapted for an ATV including a support member arched over the ATV, wherein the support member is connected to an ATV frame. The roll bar system may further include a seat belt connected to the support member.

The roll bar system may further include a seat back secured to the support member. The seat back may include a support member having a series of holes and a flexible member threaded through the series of holes.

These and other embodiment of the present disclosure will be discussed more fully in the description. The features, functions, and advantages can be achieved independently in various embodiments of the claimed invention, or may be combined in yet other embodiments.

BRIEF DESCRIPTION OF THE DRAWINGS

This disclosure may be understood by reference to the following description taken in conjunction with the accompanying drawings, in which like reference numerals identify like elements.

Figure 1:
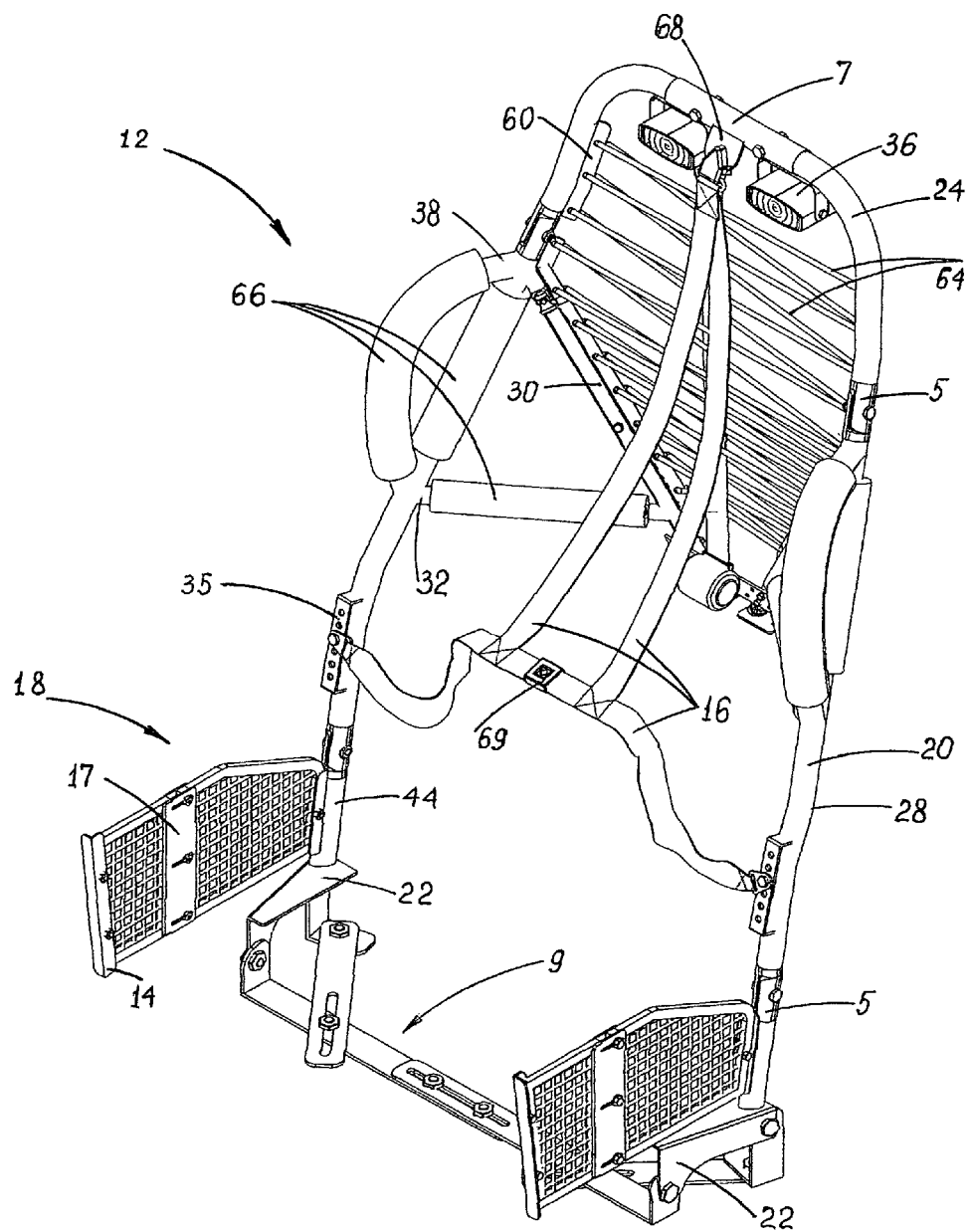
FIG. 1 is a depiction of one illustrative embodiment of an ATV roll bar system—angle view, with a laced rope seat back and padded arm and shoulder protectors installed.

While the disclosure is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the scope as defined by the appended claims.

DETAILED DESCRIPTION

In the following description, reference is made to the accompanying drawings in which is shown by way of illustration specific embodiments in which the contents of this disclosure may be practiced. These embodiments are described in sufficient detail to enable those skilled in the art to practice the invention. It is to be understood that modifications to the various disclosed embodiments may be made, and other embodiments may be utilized, without departing from the spirit and scope of the disclosure. The following detailed description is, therefore, not to be taken in a limiting sense.

FIG. 1 is an illustration of an articulating adjustable ATV roll bar system. The roll bar system is designed to mitigate severe injury or death resulting from ATV rollover accidents. The articulating adjustable ATV roll bar system is designed to fit and can be adapted to a series of different ATV brands and sizes. In an embodiment, the articulating adjustable roll bar system comprises an adjustable roll bar 12, a seat back 74, a seat belt 16, a foot and leg guards 18, an articulating adjustable ATV mounting bracket 9, a rear adjustable support mounting bracket 8 (FIG. 10), and a tube bracket connector 7. As FIGS. 1 - 7 demonstrate, the roll bar 12 comprises two adjustable side members 20 that extend upward from landing foot brackets 22 and connect accordingly by rotating locking joints 5 to the two top members 24, generally forming an arch over the ATV rider. The first and second top members 24 are formed with a radius bend that are the same radius left and right therefore top portion of roll bar is horizontal. Each side member 20 angles inward at 28. The roll bar side and top members 20 and 24 provide enough clearance above the rider that an ATV operator of typical height will not accidentally strike his head against the roll bar 12 while operating, climbing on, or climbing off the vehicle. The roll bar 12 has two adjustable rear support members 30 and two adjustable side support beams 32, each comprising a hollow metal tube. Each adjustable rear support member 30 is connected at each end to one adjustable side member 20 and to a rear adjustable support mounting bracket 40 (FIG. 10) by universal joints 6 and said bracket is bolted to the rear rack of the ATV. Each adjustable is bolted to the rear rack of the ATV. Each adjustable side support beam 32 is connected at each end to one of the adjustable side member 20 and to the adjustable rear support members 30 by an universal joints 6, forming a triangular structure that may increase the roll bar's 12 strength and allows the ATV roll bar to adjust and can be adapted to various sizes and brands of ATVs. As can be appreciated by one of ordinary skill having the benefit of this disclosure, there are many possible alternative configurations and designs for an ATV roll bar. Such configurations may have the objects of maximizing structural strength and minimizing cost and weight of the roll bar. For example, a relatively light-weight ATV may not benefit substantially from a roll bar with side support beams and/or rear support members, and thus may not include the same, thereby reducing the overall weight and cost of the roll bar. Alternatively, a roll bar for a relatively heavy ATV may include additional structural support beams to ensure that, in the event of rollover, the roll bar can support the weight of the rolling or falling ATV. The roll bar 12 is manufactured from chromoly steel. Alternatively, the roll bar may be manufactured from other materials, for example aluminum or composite materials. The roll bar may be manufactured from any substance that sufficiently exhibits the qualities of strength and durability for a roll bar application.

Referring back to FIG. 1, the roll bar system further comprises two running lights 36 rotatable attached to the underside of the tube bracket connector 7. The lights 36 may rotate around an axle parallel to the horizontal tube bracket connector 7, such that the lights may shine forward, downward upon the ATV operator, or rearward. The lights 36 are activated by a switch (not shown) located on the roll bar 12. Alternatively, the lights may be activated by a switch on the handlebars, the roll bar 12, or any other suitable location. In an alternate embodiment, the lights may swivel from side to side to provide illumination wherever the ATV operator may desire. Alternatively, the light may be fixed, precluding rotation thereof.

The roll bar 12 may be particularly beneficial because ATVs generally have an increased likelihood to rollover due to their high center of gravity and the type of terrain they typically travel over, as described above. As an ATV 10 rolls over, the operator may fall beneath it and be crushed. This is especially true if the ATV 10 is moving at a high velocity and thus may land on the operator with a large amount of force. Because the roll bar 12 is taller than the operator, it may absorb a large amount of the force from the falling or rolling ATV 10, reducing the possibility that the ATV may crush the operator or passengers. As long as the operator and any passengers remain within the arch of the roll bar 12 and the roll bar 12 remains physically intact, they will not likely be crushed by the ATV 10. The roll bar 12 may further protect the operator and passengers from injury resulting from tree branches and other obstacles in the ATV's 10 path. The roll bar 12 may deflect such obstacles away from the operator and/or passengers.

Referring back to FIGS. 1-7, the roll bar 12 includes roll bar shoulders 38. The roll bar shoulders 38 comprise a curved hollow metal tube with both ends welded to the outside edge of a side member 20. One roll bar shoulder 38 is mounted to each roll bar adjustable side member 20. The roll bar shoulders 38 may provide additional protection to the ATV operator and/or passenger in the event of a rollover. The roll bar shoulders 38 may also deflect tree branches and similar obstacles away from the operator and passenger.

Figure 10:
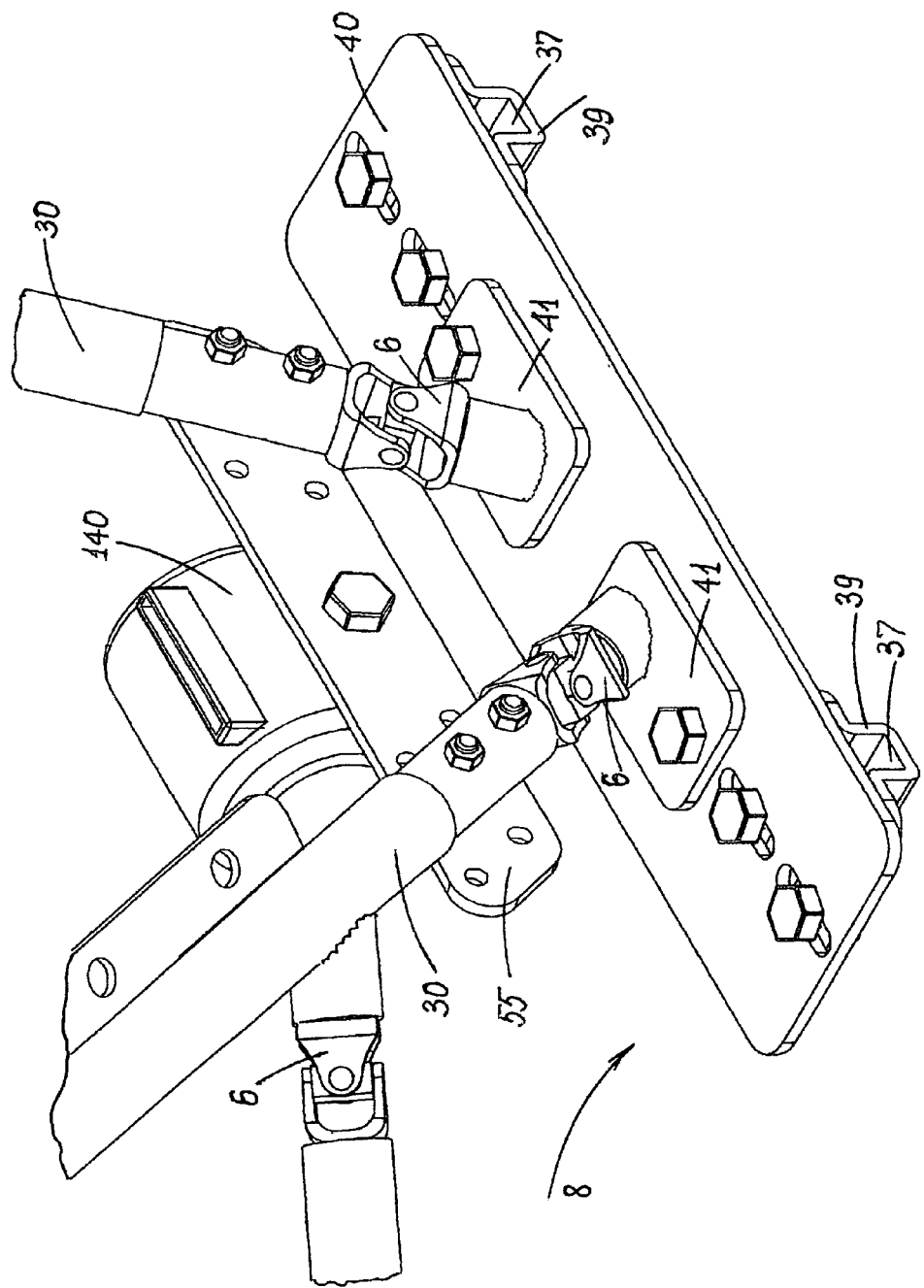
FIG. 10 illustrates angle view of the assembled rear adjustable support mounting bracket, wherein bottom portion of both adjustable rear support members attached to the said bracket by universal joints, and wherein horizontal mounting plate bolted to the said members, and wherein a seatbelt retractor bolted to the horizontal mounting plate.
Figure 11:
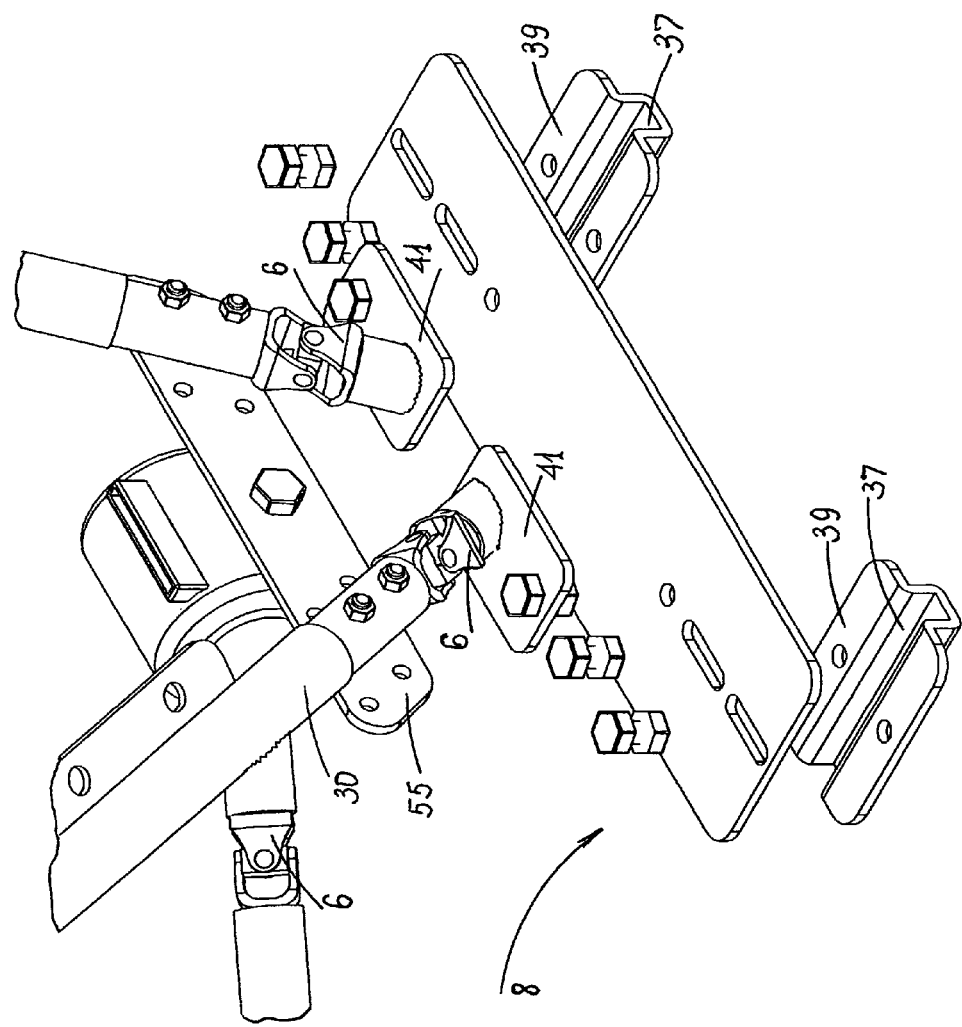
FIG. 11 illustrates angle view of the rear adjustable support mounting bracket—exploded details view.
Figure 12:
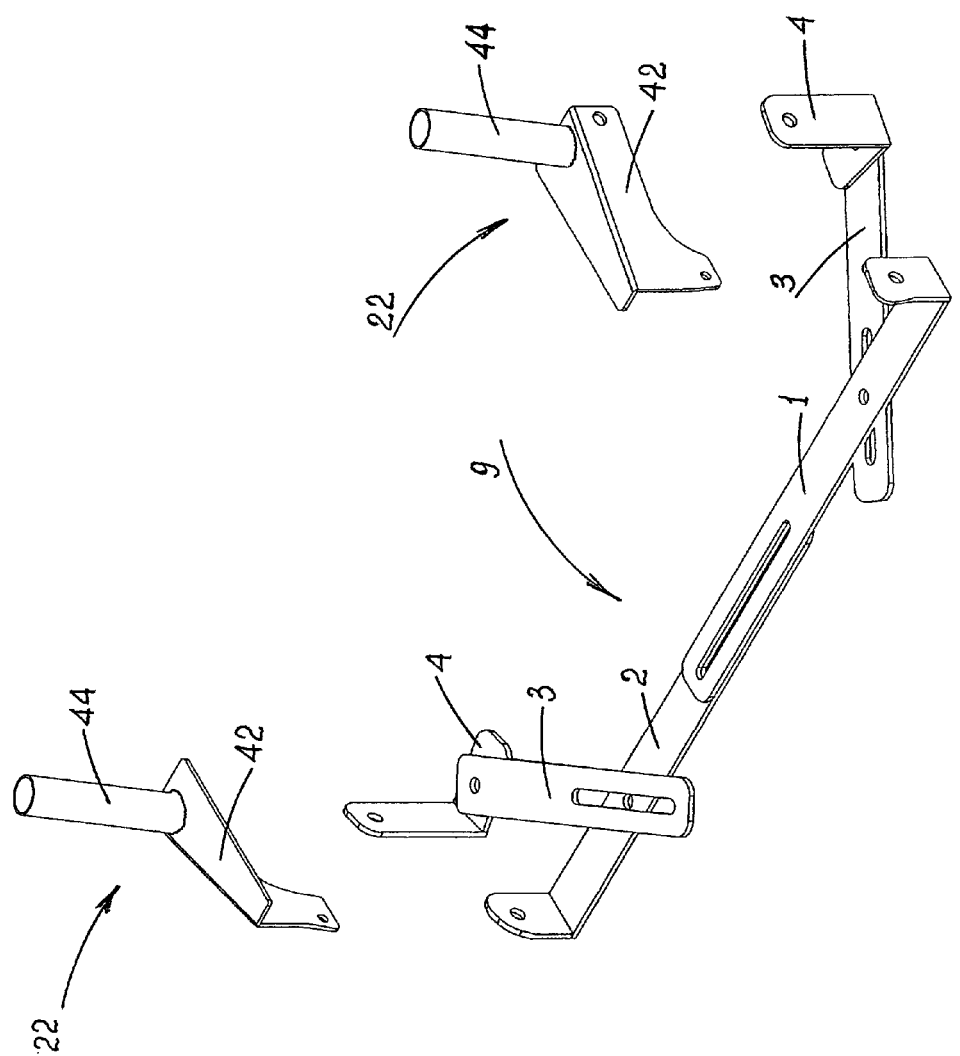
FIG. 12 illustrates an articulating adjustable ATV mounting bracket and landing foot brackets.
Figure 13:
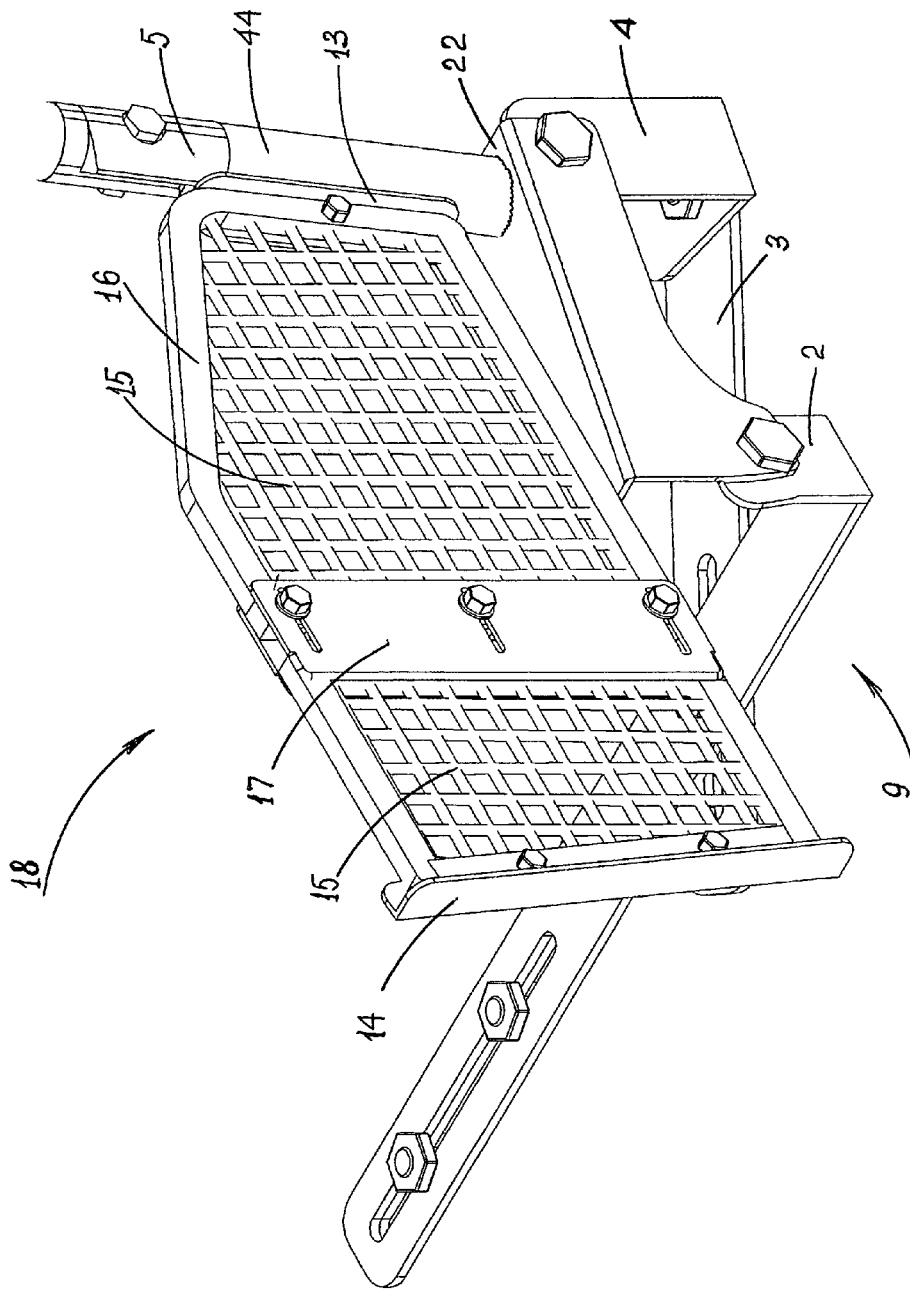
FIG. 13 illustrates an assembled adjustable foot and leg guard attached to the adjustable side member and to the angle steel support bracket.
Figure 14:
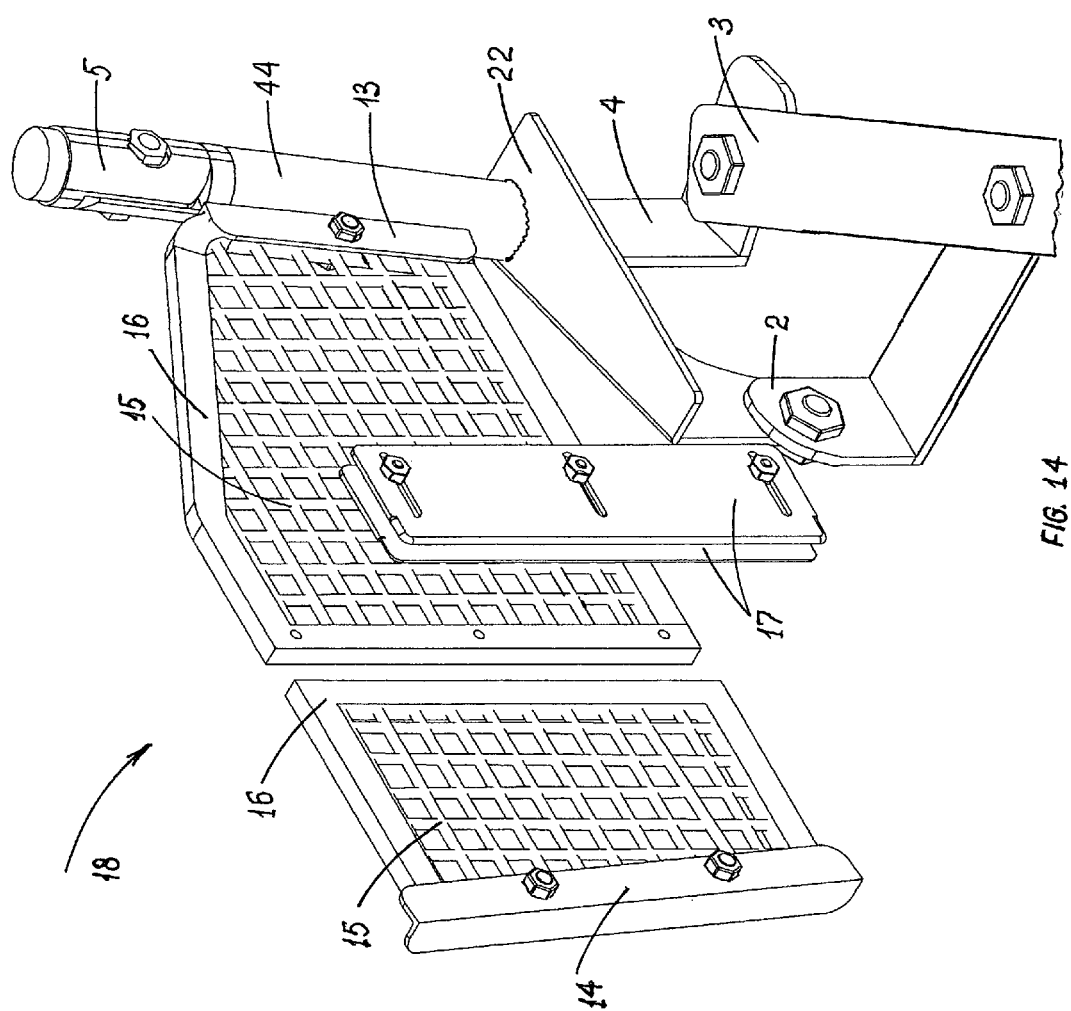
FIG. 14 illustrates a disassembled adjustable foot and leg guard bolted to the adjustable side member and to the angle steel support bracket.
Figure 15:
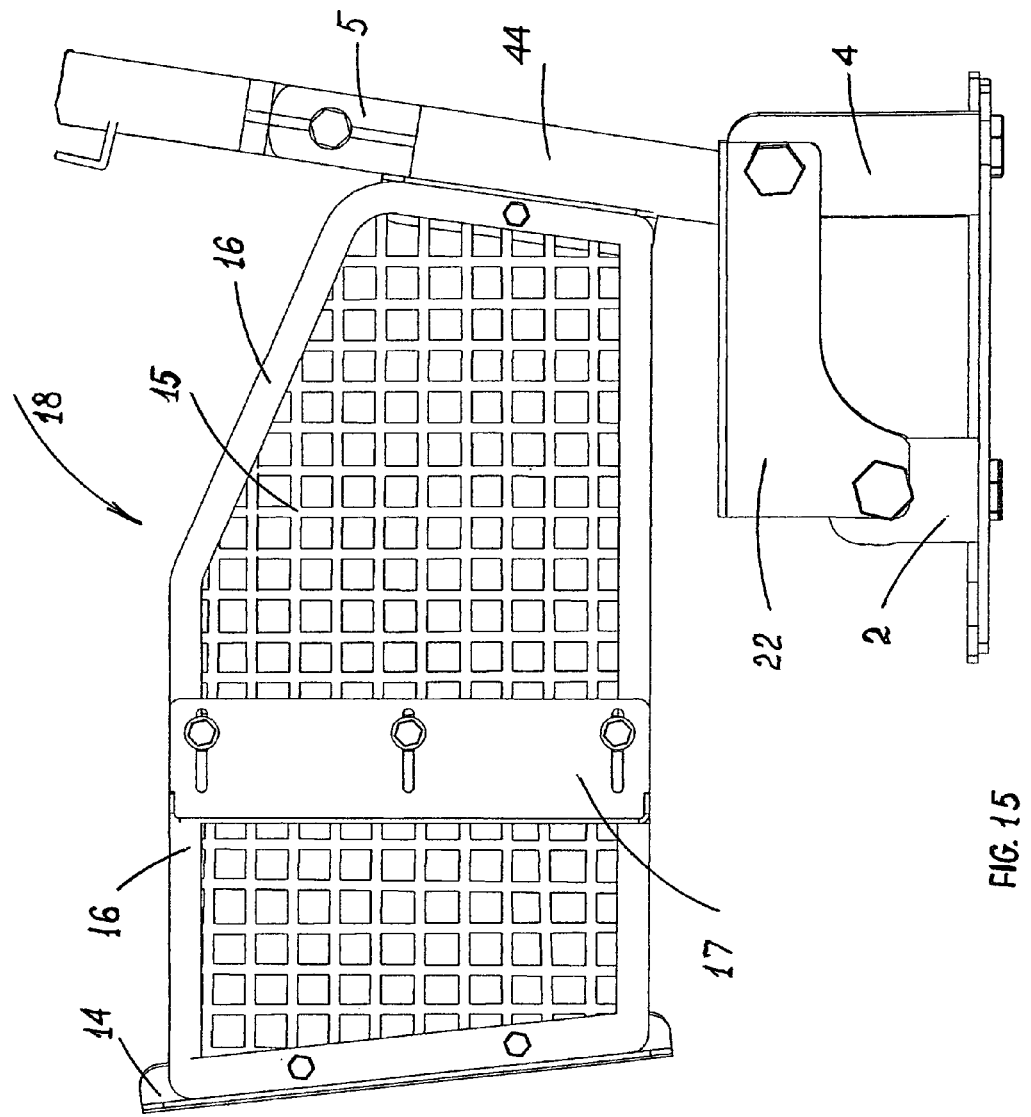
FIG. 15 illustrates an assembled adjustable foot and leg guard attached to ATV roll bar—side view.
Figure 16:
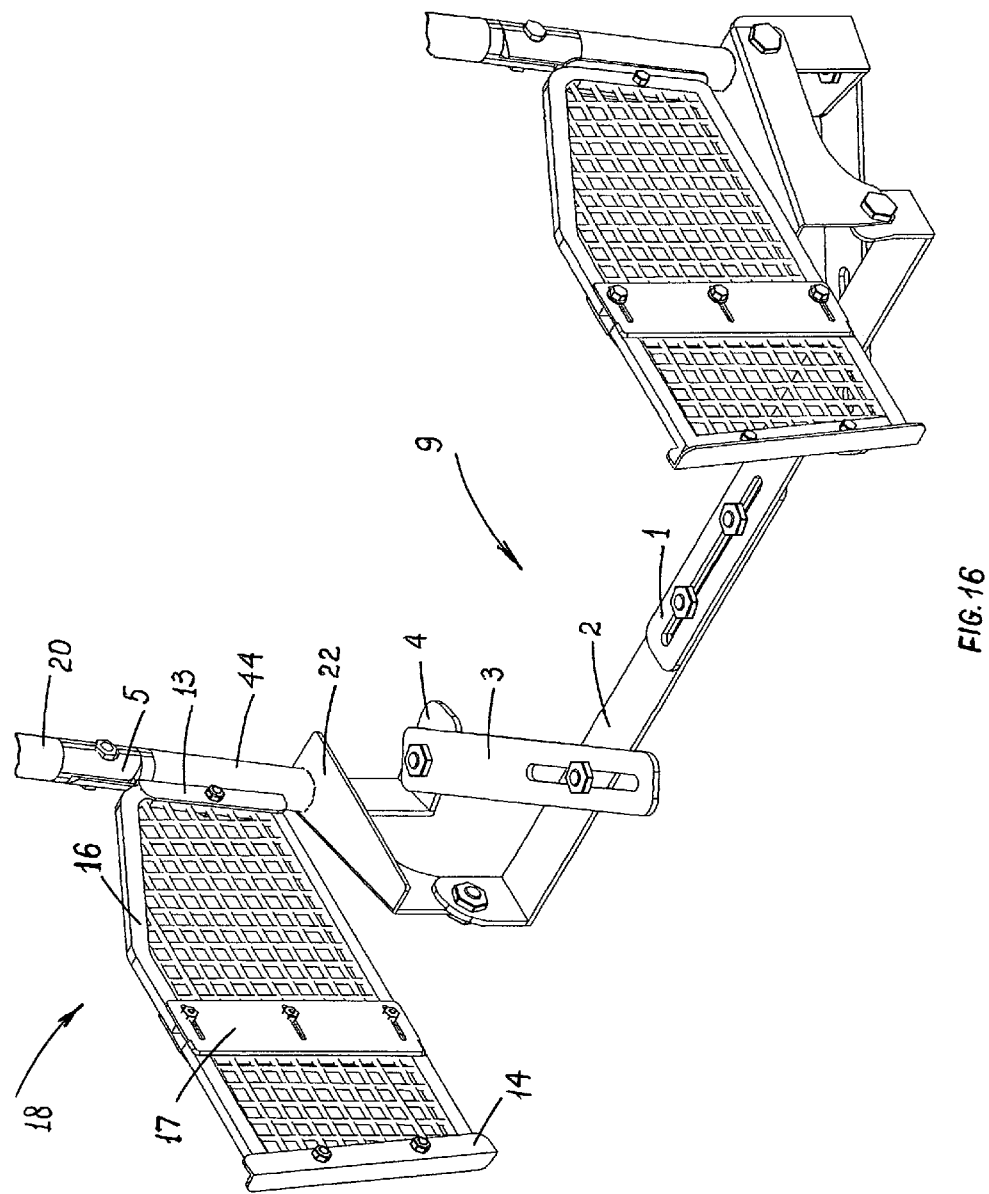
FIG. 16 illustrates adjustable foot and leg guard bolted to the adjustable side member connected to the landing foot bracket and further bolted to the articulating adjustable ATV mounting bracket.

FIGS. 10 and 11 depict mounting hardware components that anchor the roll bar 12 to a rear ATV frame 70. As shown in FIG. 10, the rear adjustable support mounting bracket 40 bolted to the universal mounting foot pads 41 of the adjustable rear support members 30 and bolted to the ATV rear frame 70 by rear rack mounting channel clamps 39. The rear adjustable support mounting bracket 40 is fabricated from a hard, durable material such as steel. Rear rack mounting channel clamps 39 are clamped and bolted to the rear ATV rack 70, and said clamps is designed with a taper 37 allowing said clamps to get tighter as mounting bolts are tightened therefore assuring said clamps 39 will not move while keeping roll bar in first mounted position. Anchoring the roll bar 12 directly to members of the ATV frame, as opposed to superficial ATV body components, may increase the likelihood that the roll bar 12 will remain intact during rollover accidents, and thus will provide increased protection to the ATV operator and/or passengers. There are various acceptable ways to anchor the roll bar 12 to the ATV frame and interconnect the various components of the roll bar 12, as would be appreciated by one of ordinary skill in the art having the benefit of this disclosure.

FIGS. 3, 4, 13, 14, 15, 16 and 19 are enlarged illustration of the adjustable foot and leg guard 18. The adjustable foot and leg guard 18 has a metal tubing frame 16 with two adjustable mounting plates 17 that are slotted to allowed contraction and expansion of foot and leg guard 18. The foot and leg guard 18 is covered by expanded flat metal 15. The foot and leg guards 18 are connected to the roll bar 12 and ATV fender 71 by a steel angle mounting brackets 14 and 13. Alternatively, the adjustable foot and leg guard 18 may be molded from high impact plastic. Said foot and leg guard may prevent the operator's feet and legs from leaving the foot rest well during a crash or rollover, thereby preventing potential severe injures to the operator. The adjustable foot and leg guards 18 also may serve to prevent rocks, sticks, and other trail debris from entering the foot rest well, which may be injurious to the operator.

FIGS. 12, 13, 14, 15, 16 illustrates the landing foot brackets 22, the adjustable foot and leg guard 18 and articulating adjustable ATV mounting bracket 9. The landing foot brackets 22 comprises a side mounting plates 42 and a tube connectors 44. The side mounting plate 42 has two flat surfaces fixed together roughly at a 90 degree angle. The tube connectors 44 are extended vertically and connected to the adjustable side members 20 by a rotating locking joint 5. An articulating adjustable ATV mounting bracket 9 comprising a flat bar 1 with adjusting slot and two drilled mounting holes, flat bar 2 with a 9.0 degree bend with three drilled mounting holes, flat bar 3 is slotted with one drilled mounting hole and flat bar 4 with a 90 degree bend with two drilled mounting holes in the horizontal and vertical portions. Adjustable side member 20 and angle steel support bracket 13 attached to the tube connector 44 and to the foot and leg guard 18. An angle steel support bracket 14 is connected to foot and leg guard 18, the metal tubing frame 16 is connected to expanded metal 15 forming the foot and leg guard 18. Landing foot bracket 22 is connected to the articulating adjustable ATV mounting bracket 9 by bolting to flat bar 4 and flat bar 2. Referring back to articulating adjustable ATV mounting bracket 9, flat bar 4 is connected to flat bar 3 and to landing foot bracket 22, flat bar 3 is connected to flat bar 4 and to flat bar 2, flat bar 2 is connected to landing foot bracket 22, to flat bar 1 and to flat bar 3, wherein adjusting ability of flat bars 1, 2, 3 and 4 therefore providing multi configurations for adapting the said bracket 9 to different models and sizes of ATVs. The particular mounting hardware described herein may vary according to the size and/or orientation of the ATV frame. Many variants of the roll bar mounting hardware described herein are foreseeable by one of ordinary skill having the benefit of this disclosure; such variants fall within the scope of the disclosure.

Figure 2:
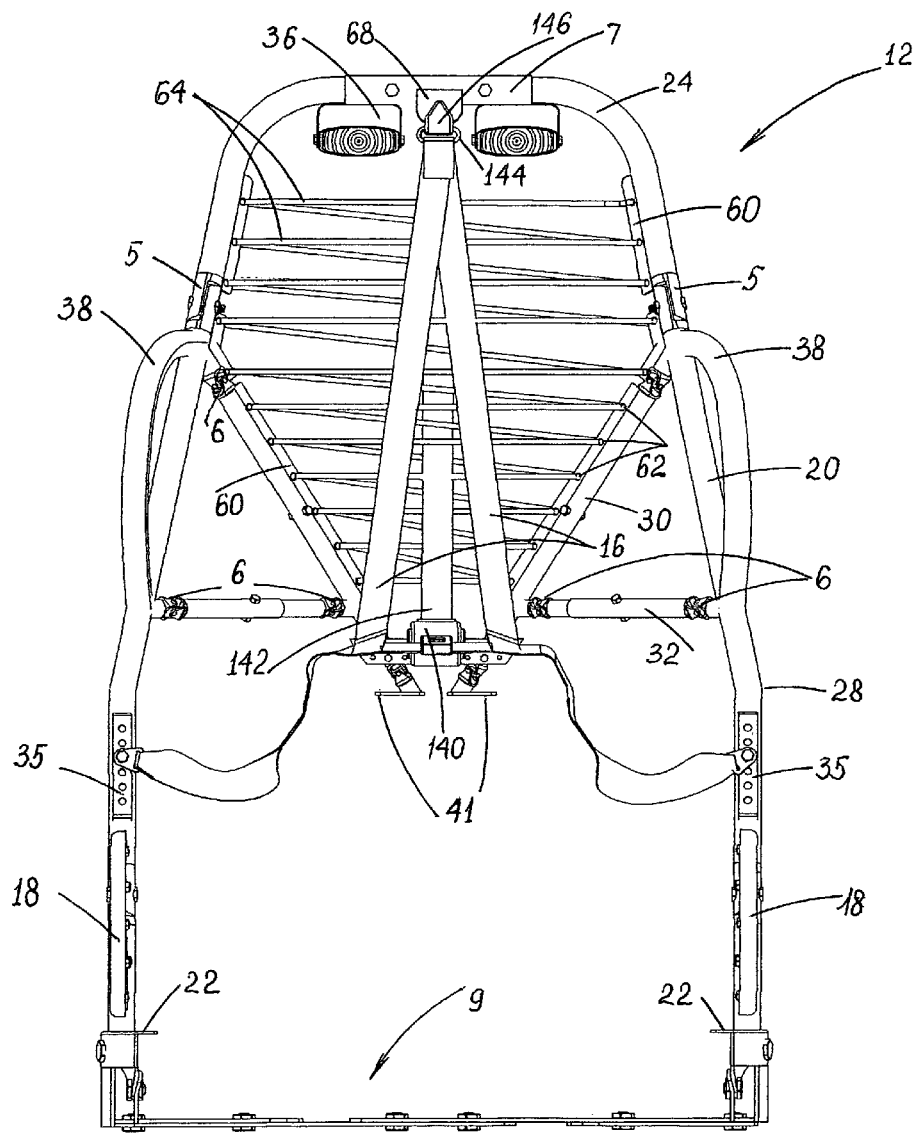
FIG. 2 is a front view of a roll bar, including a "V" strap style seat belt, lights and seat belt retractor.
Figure 3:
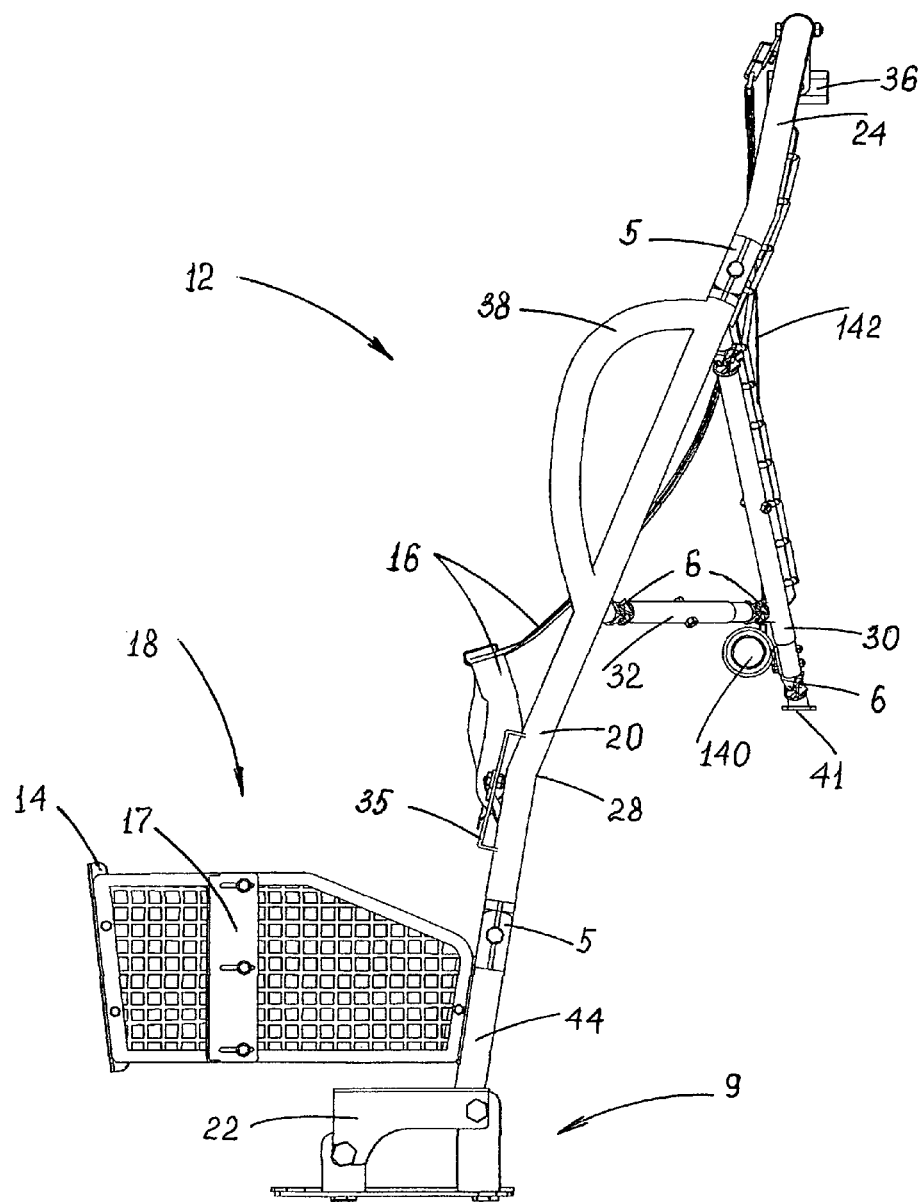
FIG. 3 is a side perspective view of a roll bar with rotating locking joints and adjustable foot guards.
Figure 4:
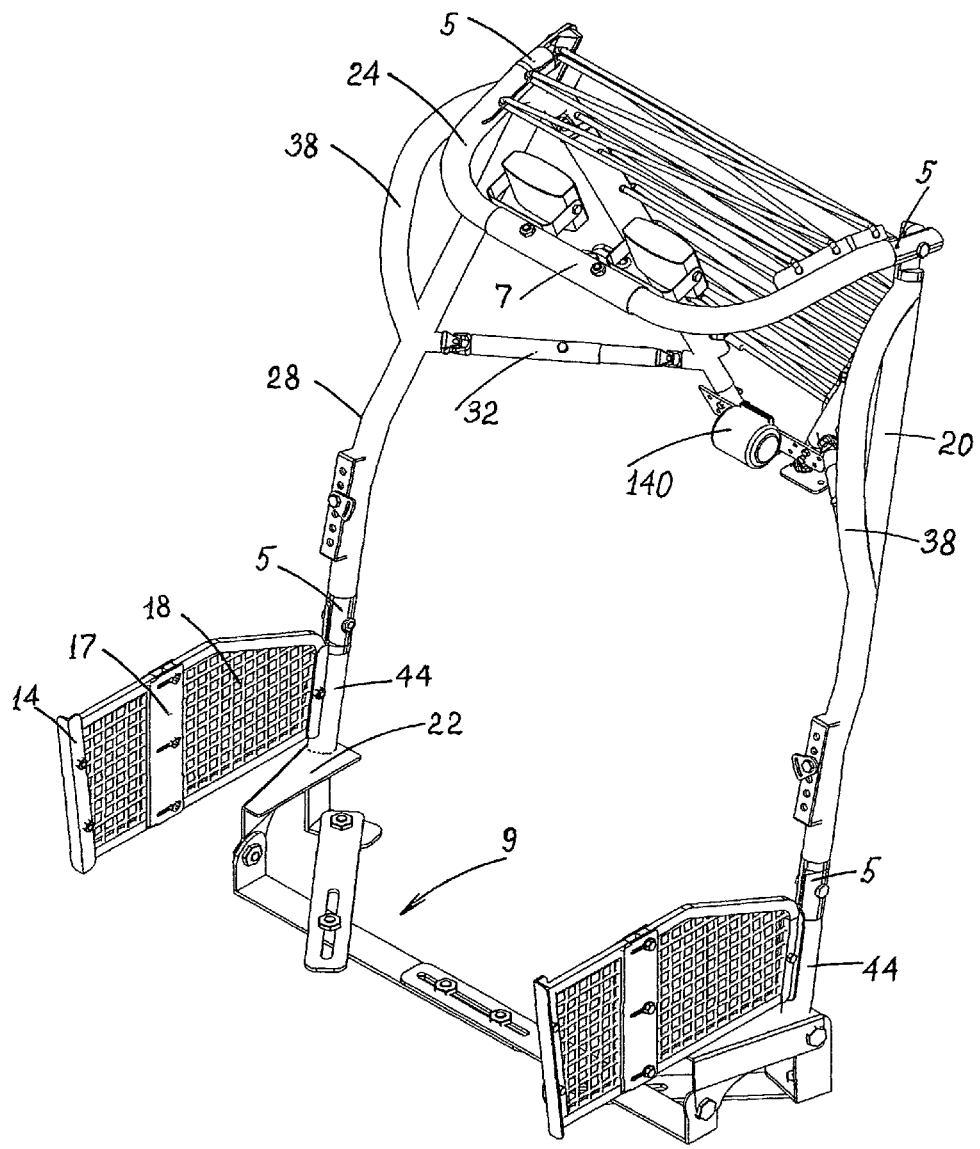
FIG. 4 illustrates an embodiment of the ATV roll bar system at the collapsed state forward, angle view.
Figure 5:
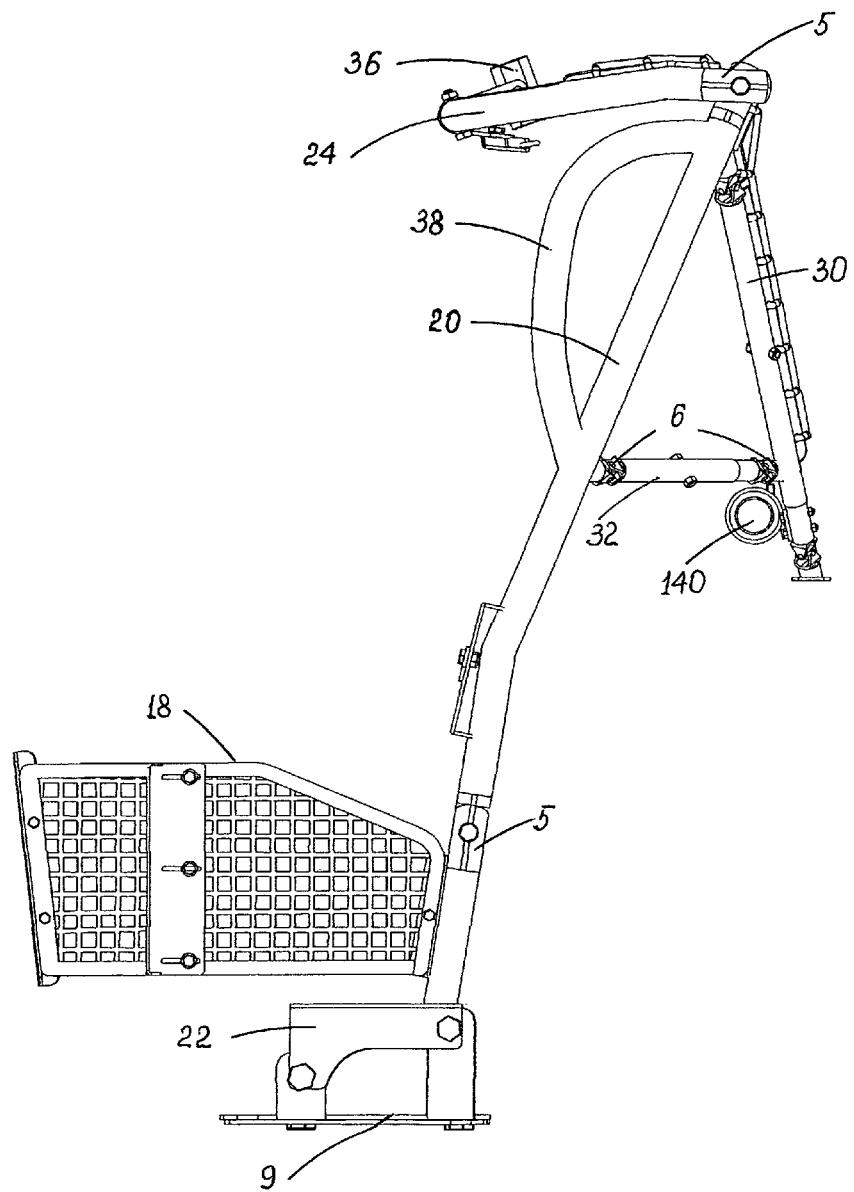
FIG. 5 illustrates an ATV roll bar system at the collapsed state forward—side view.
Figure 6:
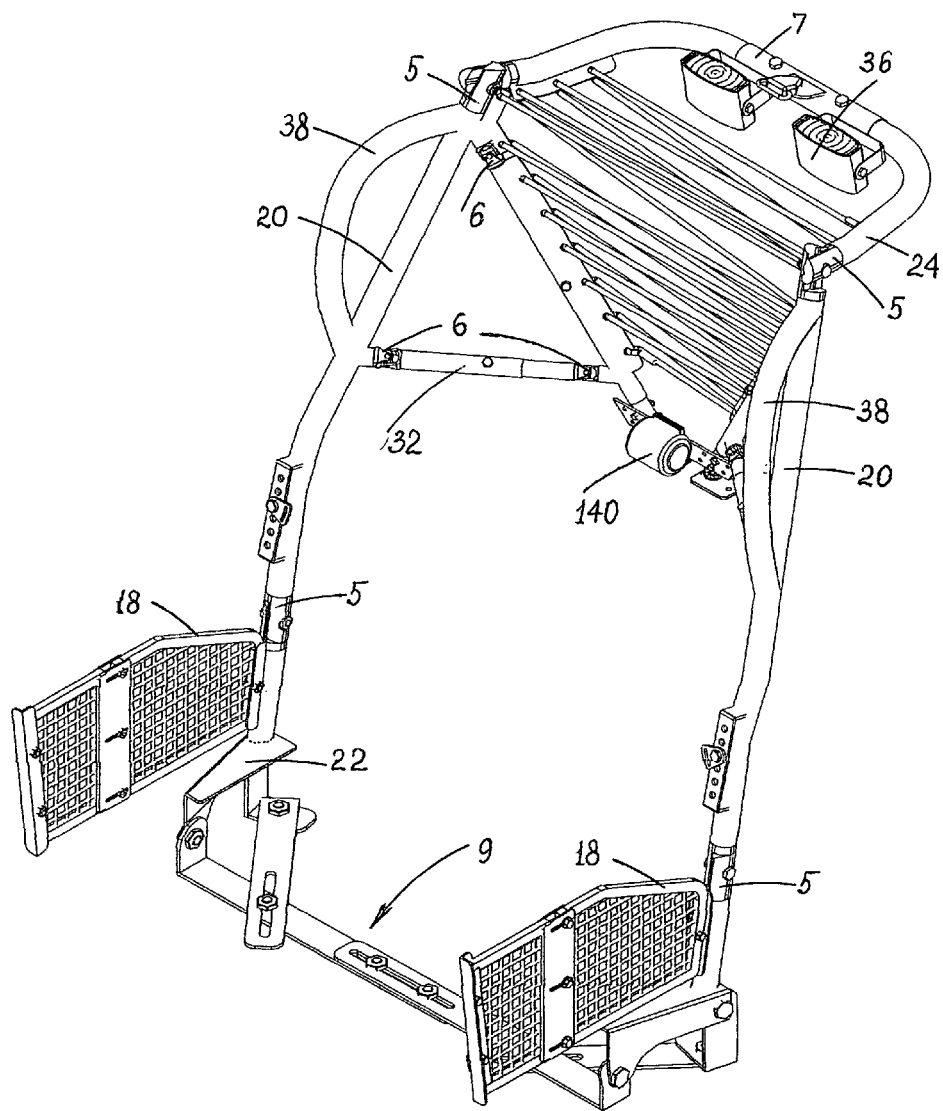
FIG. 6 illustrates an ATV roll bar system at the collapsed state backwards—angle view.
Figure 7:
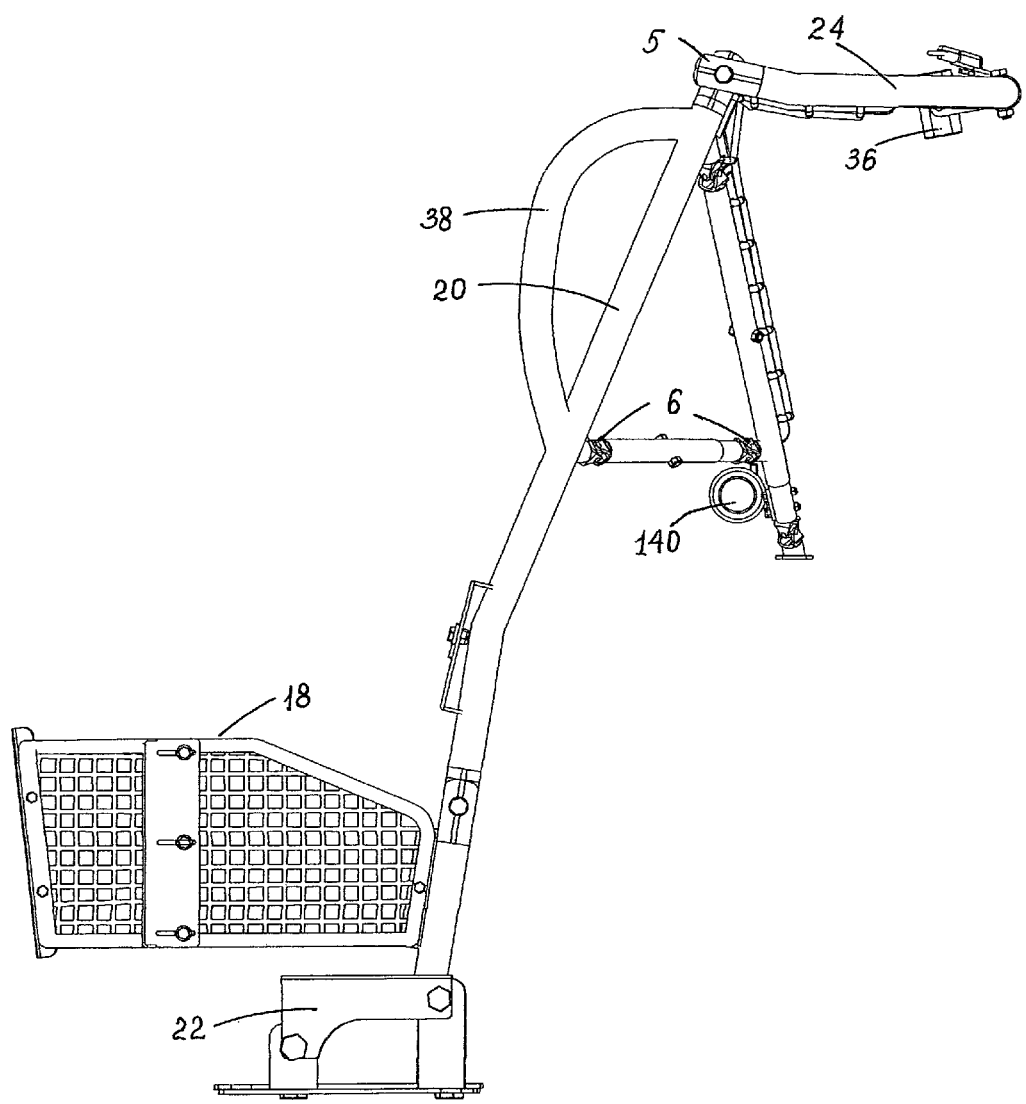
FIG. 7 illustrates an ATV roll bar system at the collapsed state backwards—side view.
Figure 8:
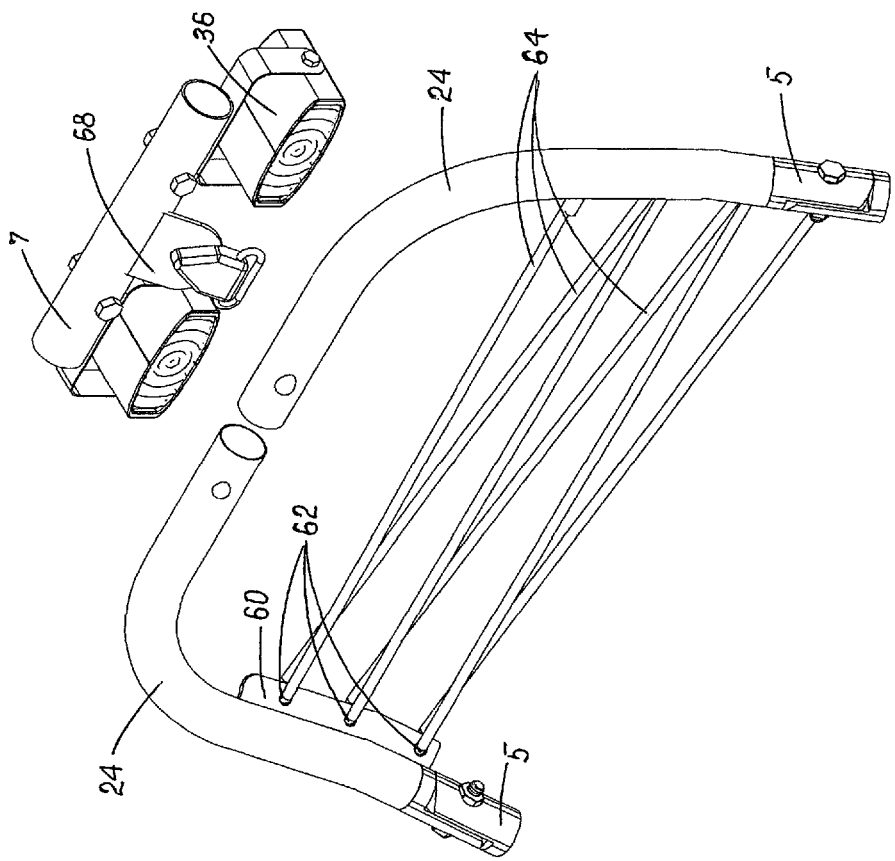
FIG. 8 illustrates an angle view of the adjustable top arch of roll bar comprising a formed steel tube having a left and right members, wherein said members are connected with a tubing sleeve comprising a tube bracket connector, wherein a set of lights and a seatbelt bracket are attached.

The roll bar system may further comprise flat steel bars 60 welded to vertical portions of the top members 24 and to the adjustable rear support members 30, as shown in FIGS. 2 and 1. The flat steel bars 60 are each welded on an inner-facing surface of the top members 24 and adjustable rear support members 30, and each have a bend conforming to the shape of the top member 24 and adjustable rear support member 30. Each flat steel bar 60 has a series of holes 62 distributed along its length. A cord 64 is laced through the holes 62, forming the seatback 74 as depicted in FIGS. 1, 2, 4 and 6. The seatback 74 serves the purpose of adding to the ATV operator's comfort by allowing him to lean back on the seatback 74 while sitting on the ATV 10. Further, the seatback 74 increases the safety of the roll bar system by preventing the operator from falling off the ATV 10 backwards. If the ATV 10 were to roll over, the seatback 74 may catch the operator and thereby prevent him from getting crushed beneath the ATV 10 as it rolls. In this manner, the seatback 74 may help the operator to maintain his position under the roll bar 12, thereby avoiding severe injury during a rollover. In the embodiment described herein, the seatback 74 is made of nylon cord 64. Alternatively, the seatback 74 may comprise webbing of a strap fabricated of any flexible, strong material.

FIG. 1 further depicts a plurality of cylindrical dense foam pads 66 situated around the roll bar 12 at locations where they may be most likely to prevent injures to the operator due to colliding with the roll bar 12. For example, portions of the roll bar 12 where the operator may be likely to hit his head or arms if involved in a crash are covered with the foam pads 66. Various locations on the roll bar 12, including locations not depicted in the figures, may be equipped with a foam pad 66 or similar protective device.

Referring back to FIGS. 1 and 19, the roll bar system further comprises an overhead seat belt connector 68 located on the roll bar 12 above the ATV operator's seat 26, a shoulder seat belt connector 68 located above the driver's left shoulder, and a plurality of side seat belt connectors 35 on the roll bar 12 to either side of the ATV operator's seat 26, including adjustable seat belt connector 35. The roll bar system comprises seat belt 16 straps and buckles 69 that may be used to secure the operator to the ATV 10. Seat belt connector 35 is a flat metal piece with a series of holes passing through. The seat belt connectors 35 may be welded or bolted to the roll bar 12. The seat belt 16 components may be bolted to the connectors 68 and 35 in the various configurations described above, according to the driver's preference. Alternatively, the seat belt connectors 68 and 35 may be manufactured from any strong, durable material. Likewise, the seat belt connectors 68 and 35 may be manufactured into any shape which allows the ATV operator to secure a seat belt onto the roll bar 12.

The seat belt 16 straps may include strap pads at points on the seat belts 16 that contact the ATV operator. Such pads may increase the rider's comfort by spreading out pressure. from the. seat belts 16 over a greater area on the. ATV operator's body. The seat belts 16 may further include adjusting buckles to allow the ATV operator to adjustably secure himself to the ATV in a snug manner. The seat belt adjustment buckles may be placed on various seat belt 16 straps, thereby allowing the ATV operator to lengthen or shorten shoulder or side seat belt 16 straps.

As shown in FIGS. 1, 2, 9 and 10 the ATV may include a seat belt retractor 140. The seat belt retractor 140 is bolted to a horizontal mounting plate 55 that is bolted to the bottom portion of the adjustable rear support members 30. A retractable seat belt 142 rolls up within the retractor 140 when not being used due to a continuous tension applied to the retractable seat belt 142 by a spring (not shown) within the retractor 140. As shown in FIG. 2, the retractable seat belt 142 extends upward from the retractor 140, passes through a slot 144 in a seat belt bracket 146 connected to the tube bracket connector 7 by seat belt connector 68, and hands there from. A seat belt connector 68 is fastened to the hanging end of the retractable seat belt 142. The seat belt connector 68 may connect to other seat belt 16 straps and buckles 69 (not shown) that may be connected to the side seat belt connectors 68 (not shown), thereby securing the operator to the ATV.

The operator extends the seat belt 142 from the retractor 140 by pulling the seat belt 16, at which point he may interconnect the seat belt buckles 69, thereby securing himself to the ATV. While the operator is driving the ATV equipped with the seat belt retractor 140, the spring within the retractor 140 continuously applies tension to the seat belts 16 via the retractable seat belt 142, thus maintaining the seat belts 16 snugly against the operator's body. However, the operator may still move upon the seat 26, lean, and perform other motions common during ATV driving. As the operator performs such movements, the seat belt 142 and 16 remain taut due to the internal spring of the retractor 140.

When the ATV 10 undergoes sudden or rapid movement, such as deceleration due to collision, a rollover event, going airborne, or emergency braking, the retractor 140 locks, preventing the retractable seat belt 142 from being further extended from the retractor 140, which prevents additional movement of the seat belt 16. In this manner, the seat belts 142, 16 and retractor 140 may maintain the operator in place on the ATV seat 26 and may prevent injury or death.

Figure 18:
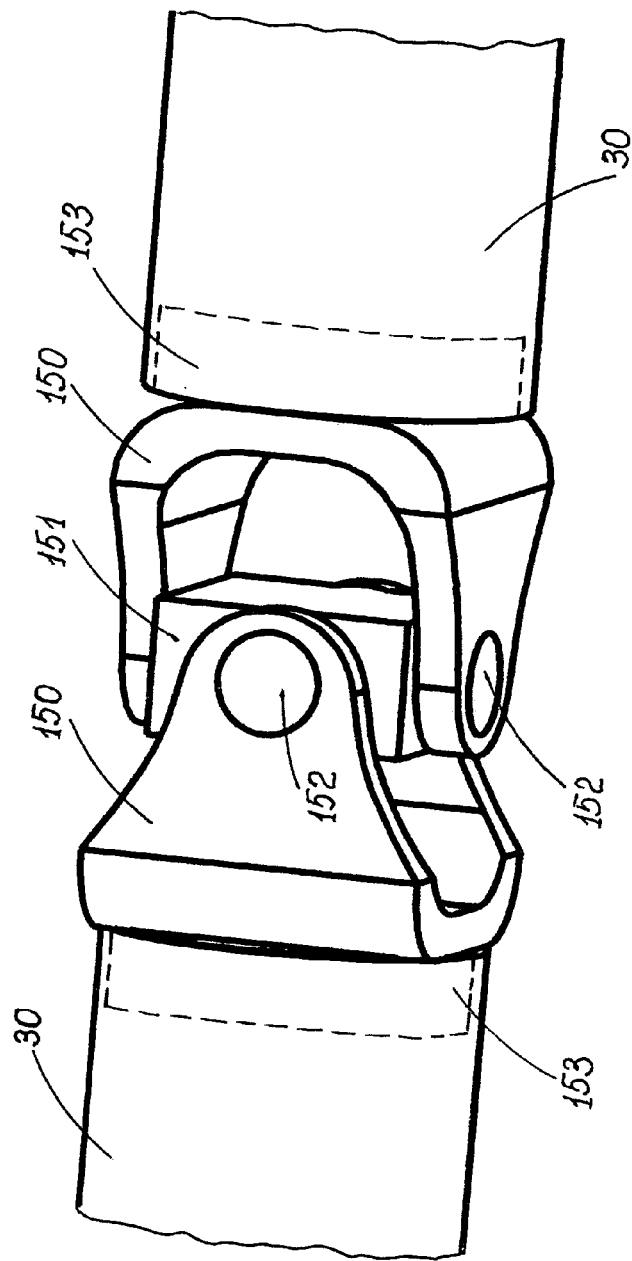
FIG. 18 illustrates an universal joint—side view.

FIG. 18 illustrates the universal joint 6 having both articulating and adjustable ability, therefore allowing the adjustable rear support members 30 to be properly aligned to connect to the rear adjustable support mounting bracket 40, wherein the articulating and adjustable universal joint 6 will be beneficial in providing proper alignment assuring the right fit for various sizes and brands of ATVs. The universal joint 6 comprises two "U" shaped connectors 150 with a metal stud 153 inserted and welded into the adjustable rear support members 30 and adjustable side support beams 32, wherein the "U" shaped connectors 150 are connected to the square metal block 151 by metal pins 152, and wherein said block has clearance holes allowing rotation around metal connection pins 152.

Figure 9:
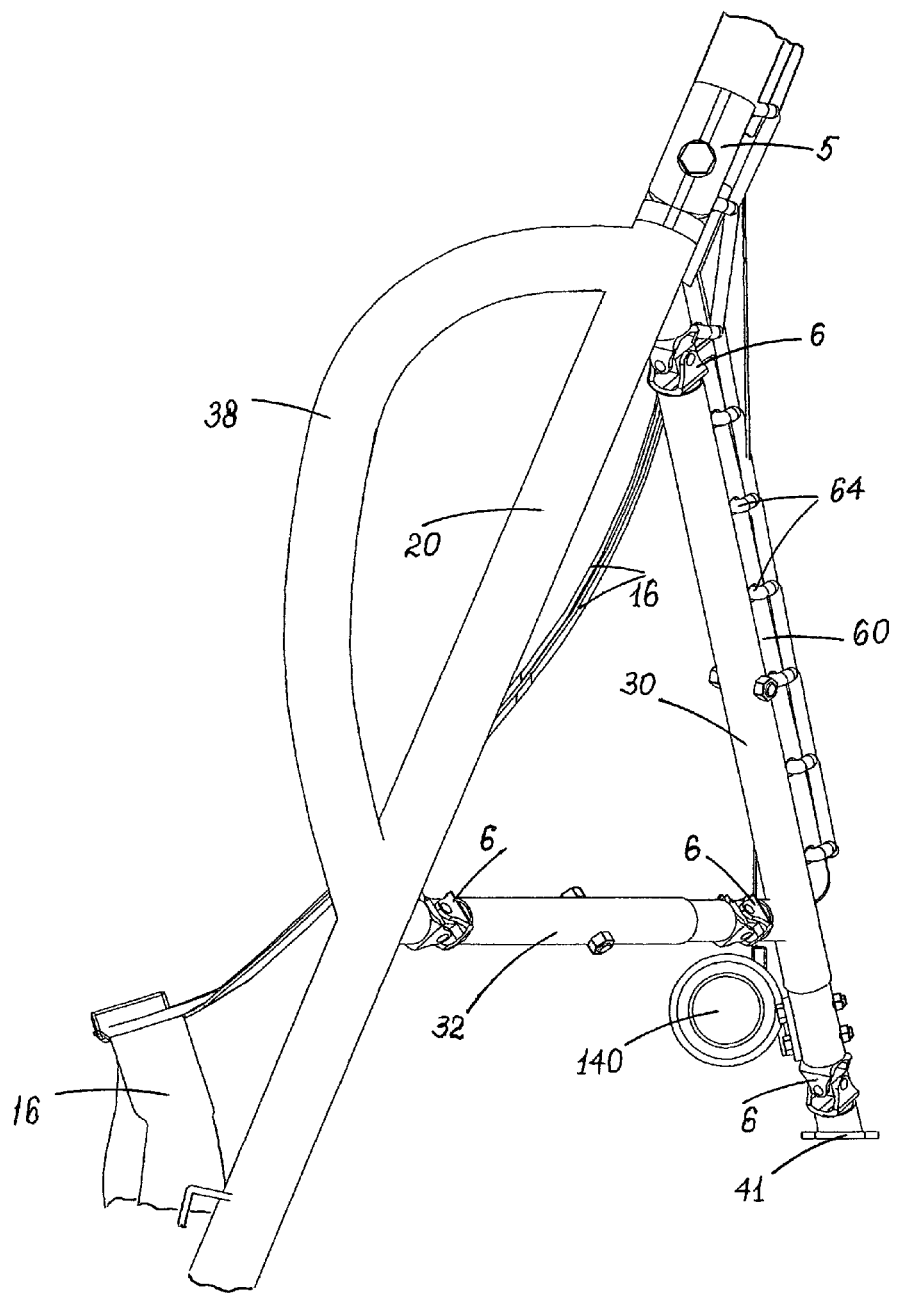
FIG. 9 illustrates side view of the middle portion of the roll bar system, wherein the adjustable side member along with an attached shoulder, adjustable rear support member and adjustable side support beam are connected all together by universal joints, and wherein bottom portion of the adjustable rear support member attached by universal joint to the rear adjustable support bracket.
Figure 19:
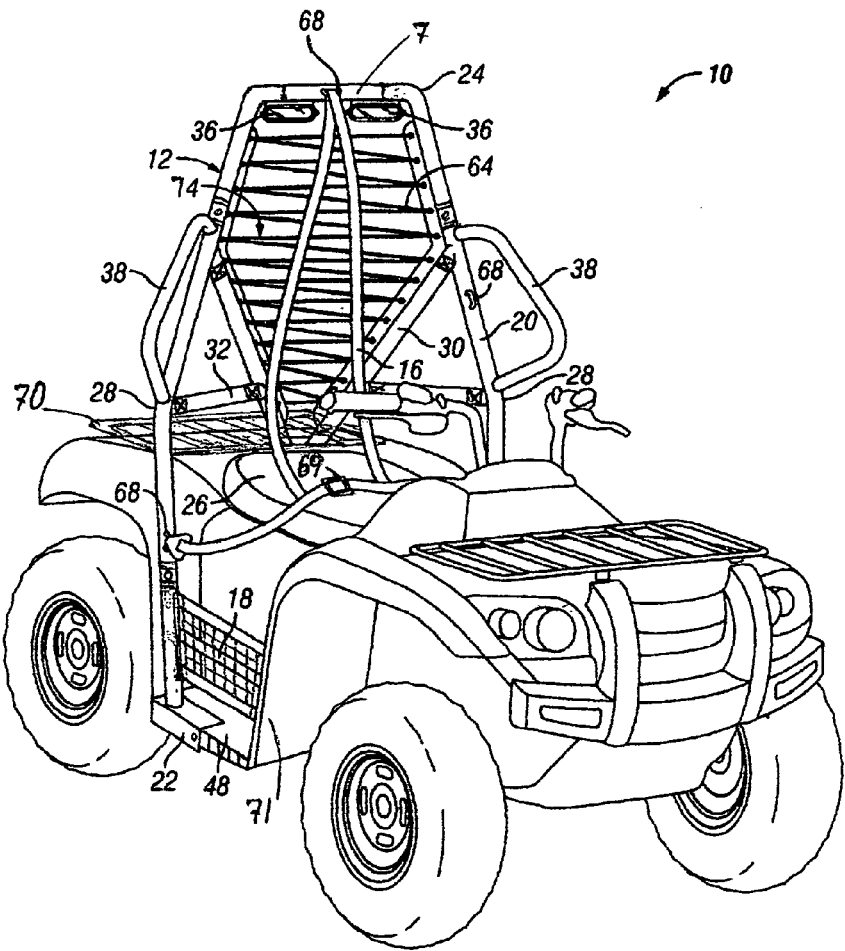
FIG. 19 is a depiction of an articulating adjustable ATV roll bar system installed onto an ATV.

FIGS. 1, 9 and 19 illustrates first and second shoulders 38 comprising a formed metal tubing, wherein said shoulders are attached accordingly to the first and second adjustable side members 20, further a body protective paddings 66 are attached to both shoulders 38 therefore protecting the body upon contact with the ground.

FIGS. 4, 5, 6, 7 and 17 illustrates the rotating locking joint 5 joins together the adjustable side members 20 and the top members 24 by inserting a section of one half of the rotating locking joint 92 into the top section of the adjustable side member 20, and by inserting a section of the other half of the rotating locking joint 91 into the top member 24, wherein the top members 24 are adjustable backward and forward therefore allowing the ATV to be loaded into a closed hauling trailer and pass under lower objects such as a tree limb. The ability of roll bar 12 to thereby collapse allows an ATV to travel across terrain where the height of an uncollapsed roll bar may restrict access. For example, certain trails have trees and other growth which would restrict passage of an ATV with an uncollapsed roll bar 12 because of its height, whereas a collapsed roll bar 12 may have a low enough profile that the ATV can pass through unimpeded. Similarly, transport of an ATV may be made easier with the collapsed roll bar 12. For example, certain trailers may have a ceiling that is too low to allow entrance to an ATV with an uncollapsed roll bar; the ATV user may need to remove any roll bar that is too tall to fit within such a trailer. However, the adjustable roll bar 12 may collapse and thereby fit within trailers that are otherwise be too small to accept an ATV with a roll bar.

Figure 17:
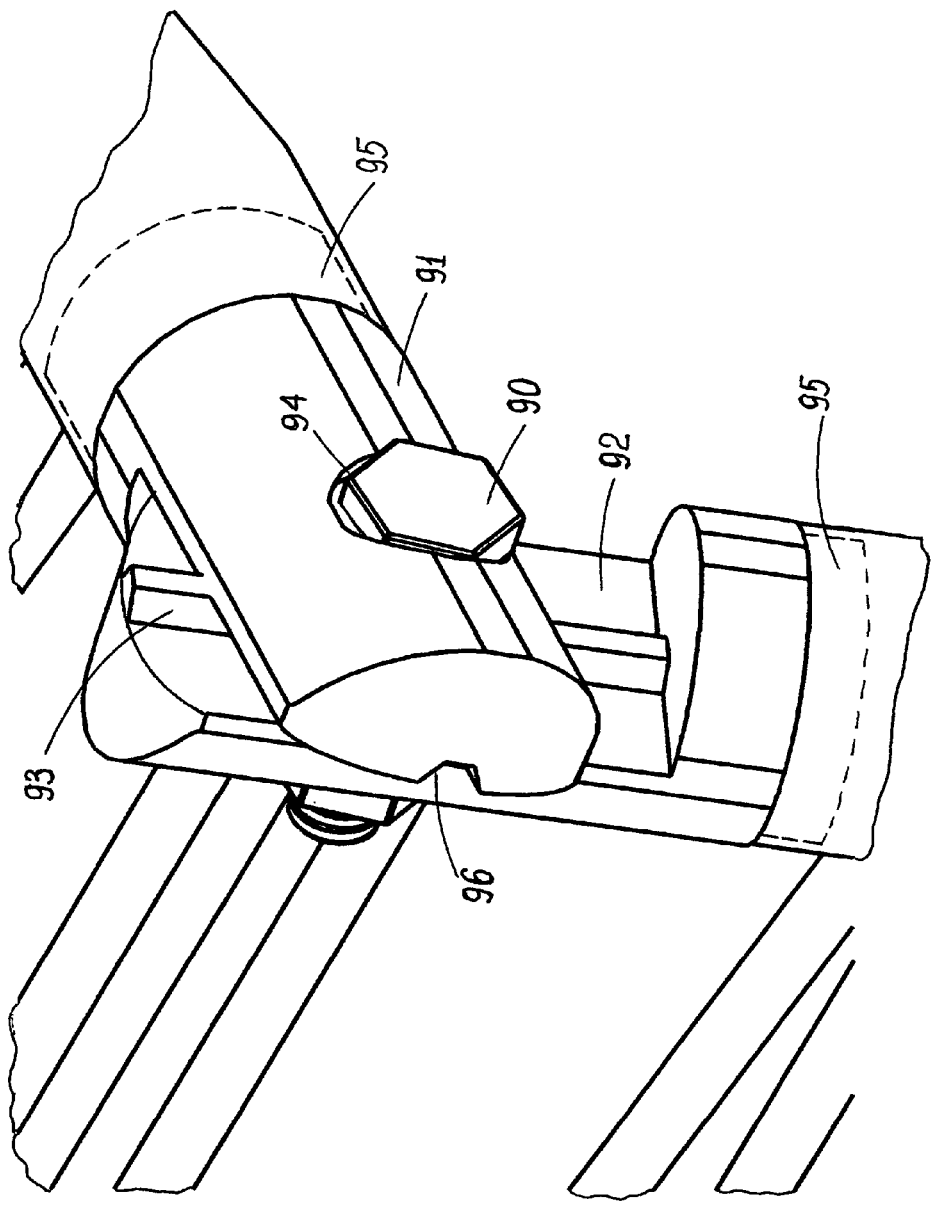
FIG. 17 illustrates a rotating locking joint system—side view.

FIG. 17 is enlargement illustration of the rotating locking joint system 5 comprising a machined steel joint with a male key 93 and a female key slot 96, wherein the rotating locking joint 5 will lock into position when the male key 93 and female key slot 96 aligns. The joint is a machined steel round bar 91 and 92, wherein the steel round bar is machined with a smaller diameter 95 to insert into the first and second adjustable side members 20. The rotating locking joint 5 is a two piece design 91 and 92 comprising a drilled hole 94, therefore a bolt 90 secures and locks the rotating locking joint 5.

The roll bar system and components thereof, as described herein, may be retrofitted onto an ATV by modifying the components to fit the ATV. For example, the mounting plates and other mounting hardware may be mounted at positions different than those described in the disclosure based upon the shape of the ATV frame. Other modifications would be apparent to one of ordinary skill having the benefit of this disclosure.

Although various embodiments have been shown and describe herein, other embodiments that are apparent to those of ordinary skill in the art having the benefit of this disclosure, including embodiments that do not provide all of the features and advantages set forth herein, are also within the scope of the disclosure. Rather, the scope of the disclosure is defined only by reference to the appended claims and equivalents thereof.

The invention claimed is:

1. An ATV (all terrain vehicle) Safety Bar comprised of: an articulating adjustable ATV roll bar safety system comprised of: a roll bar having first and second adjustable side members, first and second top members, wherein the first and second adjustable side members are connected accordingly to the first and to the second top members by rotating locking joints, and wherein the first and second top members are connected to each other by a tube bracket connector, wherein lights and a seatbelt are connected, and wherein the first and second adjustable side members and the first and second top members comprise tubing, and wherein the adjustable side members generally extend vertically and are connected by respective bottom ends to land foot brackets by rotating locking joints, and the landing foot brackets are connected to an articulating adjustable ATV mounting bracket, wherein said adjustable ATV mounting bracket is bolted to an ATV bottom frame, thereby forming a protective frame for placement around an ATV rider;

first and second adjustable rear support members, wherein a first end of the first adjustable support member is connected to the first adjustable side member by a universal joint, and a second end of the first adjustable support member is connected to a rear adjustable support mounting bracket by a universal joint, and wherein a first end of the second adjustable support member is connected to the second adjustable side member by a universal joint, and a second end of the second adjustable support member is connected to the rear adjustable support mounting bracket by a universal joint, wherein the rear adjustable support mounting bracket is fixed to a rear ATV frame by rear mounting channel clamps;

first and second adjustable side support beams, wherein a first end of the first adjustable support beam is connected to the first adjustable rear support member by a universal joint and a second end of the first adjustable side member support beam is connected to the first adjustable side member by a universal joint, and wherein a first end of the second adjustable side support beam is connected to the second adjustable rear support member by a universal joint, and wherein a second end of the second adjustable side support beam is connected to the second adjustable side member by a universal joint, and wherein the first and a-second adjustable rear support members and first and second adjustable side support beams can be extended or shortened to assure perfect alignment and proper fit, and wherein said adjustable rear support members have predrilled holes to accept a horizontal mounting plate for a seatbelt retractor, wherein further the first adjustable side member, a first adjustable rear support member and a first adjustable side support beam comprise a first adjustable triangle, and wherein further the second adjustable side member, a second adjustable rear support member and a second adjustable side support beam comprise a second adjustable triangle;

a seat back rest comprising a first flat steel bar, a second flat steel bar and a flexible member, wherein the first steel bar is integrated to the first adjustable rear support member and to the first top member, and the second flat steel bar is integrated to the second adjustable rear support member and to the second top member, wherein further the flat steel bars have series of holes and the flexible member is threaded through the series of holes;

first and second shoulders comprising a formed metal tubing, wherein said shoulders are attached to the first and second adjustable side members accordingly, and wherein body protective paddings are attached to each shoulder;

first and second adjustable foot and leg guards, wherein said guards are connected to the landing foot brackets and to ATV fenders by steel angle mounting brackets, wherein the adjustable foot and leg guards sit on a foot rest of the ATV, and wherein the adjustable foot and leg guards have a metal tubing frame with two adjustable mounting plates that are slotted to allow contraction and expansion of the adjustable foot and leg guards;

the articulating adjustable ATV mounting bracket comprised of first, second, third and fourth flat bars having different lengths and configurations from each other, wherein said articulating adjustable ATV mounting bracket connected to both landing foot bracket and attached to the ATV bottom frame, and wherein the roll bar connected to the articulating adjustable ATV mounting bracket forms a protective metal frame for placement around the ATV rider, and wherein adjusting ability of the articulating adjustable ATV mounting bracket provides multi configurations for adapting the ATV mounting bracket to different models and sizes of ATVs;

the seat belt and a plurality of seat belt connectors are fixed to the roll bar; the seat belt connectors are adapted to connect a portion of the seat belt to the roll bar;

a seat belt retractor, wherein said horizontal mounting plate is connected to a bottom portion of the adjustable rear support members, and wherein the seatbelt retractor is bolted to the horizontal mounting plate, and wherein further the seatbelt retractor has a locked state and an unlocked state, wherein a portion of the seat belt is connected within the retractor, and wherein the retractor is adapted to allow the extension of the seat belt from within the retractor while unlocked and to prevent the extension of the seat belt from within the retractor while locked.

* * * * *